(12) United States Patent
Prud'Homme-Lacroix

(10) Patent No.: US 8,430,357 B2
(45) Date of Patent: Apr. 30, 2013

(54) TAIL SKID FOR PROTECTING A STRUCTURAL ELEMENT OF AN AIRCRAFT, AN AIRCRAFT PROVIDED WITH SUCH A TAIL SKID, AND AN ANTI-OVERTURNING METHOD IMPLEMENTED BY SAID TAIL SKID

(75) Inventor: Pierre Prud'Homme-Lacroix, Vitrolles (FR)

(73) Assignee: Eurocopter, Marignane Cedex (FR)

( * ) Notice: Subject to any disclaimer, the term of this patent is extended or adjusted under 35 U.S.C. 154(b) by 343 days.

(21) Appl. No.: 12/952,428

(22) Filed: Nov. 23, 2010

(65) Prior Publication Data
US 2011/0127377 A1   Jun. 2, 2011

(30) Foreign Application Priority Data

Nov. 30, 2009 (FR) ..................................... 09 05767

(51) Int. Cl.
*B64C 25/00* (2006.01)
(52) U.S. Cl.
USPC ........................ 244/109; 244/121; 244/102 R
(58) Field of Classification Search .................. 244/109, 244/121, 102 R
See application file for complete search history.

(56) References Cited

U.S. PATENT DOCUMENTS

| 1,362,511 | A | | 12/1920 | Roe | |
|---|---|---|---|---|---|
| 1,435,244 | A | * | 11/1922 | Kemp | 244/119 |
| 1,436,934 | A | * | 11/1922 | Bazaine | 244/90 R |
| 1,522,672 | A | * | 1/1925 | Clark | 244/109 |
| 1,693,503 | A | * | 11/1928 | Dworack | 244/109 |
| 1,872,811 | A | | 2/1929 | Reel | |
| 1,744,572 | A | * | 1/1930 | Pendergrass | 244/109 |
| 1,792,966 | A | * | 2/1931 | Cato | 244/109 |
| 1,806,807 | A | * | 5/1931 | Friederika | 244/108 |
| 4,196,878 | A | | 4/1980 | Michel | |

(Continued)

FOREIGN PATENT DOCUMENTS

| FR | 2554210 A1 | 5/1985 |
|---|---|---|
| GB | 357476 | 9/1931 |
| GB | 462963 A | 3/1937 |
| WO | 9608409 A2 | 3/1996 |

OTHER PUBLICATIONS

French Search Report, Application No. FR 0905767, dated Jul. 12, 2010.

*Primary Examiner* — Christopher P Ellis
*Assistant Examiner* — Medhat Badawi
(74) *Attorney, Agent, or Firm* — Brooks Kushman P.C.

(57) ABSTRACT

The present invention relates to a tail skid (10) for a rotorcraft (1), the tail skid comprising a contact blade (11) extending from a contact first end (11') towards a second end (11"), said contact first end (11') being provided with a top face (12) suitable for facing a structure (7) of the rotorcraft (1) and a bottom face (13) suitable for facing towards the ground (2) when said tail skid (10) is fastened to a rotorcraft (1) standing on the ground (2), said bottom face (13) having a first area. The tail skid includes an additional contact member (21) suitable for preventing said bottom face (13) from coming into contact with the ground (2), and fastener means (30) for fastening said additional member (21) to said first end (11'), said additional member (21) having a fastener face (22) and a contact face (23) presenting a second area that is greater than said first area, the fastener means (30) holding said fastener face (22) against said bottom face (13) so that said bottom face (13) is completely covered by said additional member (21).

9 Claims, 1 Drawing Sheet

U.S. PATENT DOCUMENTS

| | | | | |
|---|---|---|---|---|
| 4,399,963 | A | * | 8/1983 | Schafer .................... 244/104 R |
| 4,815,678 | A | * | 3/1989 | Gawne ......................... 244/109 |
| 5,056,737 | A | * | 10/1991 | Taylor ......................... 244/7 B |
| 5,927,646 | A | * | 7/1999 | Sandy et al. ................. 244/108 |
| 6,845,944 | B2 | * | 1/2005 | Bays-Muchmore et al. . 244/109 |
| 2004/0200930 | A1 | * | 10/2004 | Bays-Muchmore et al. . 244/109 |
| 2011/0049295 | A1 | * | 3/2011 | Mairou et al. ................ 244/121 |

* cited by examiner

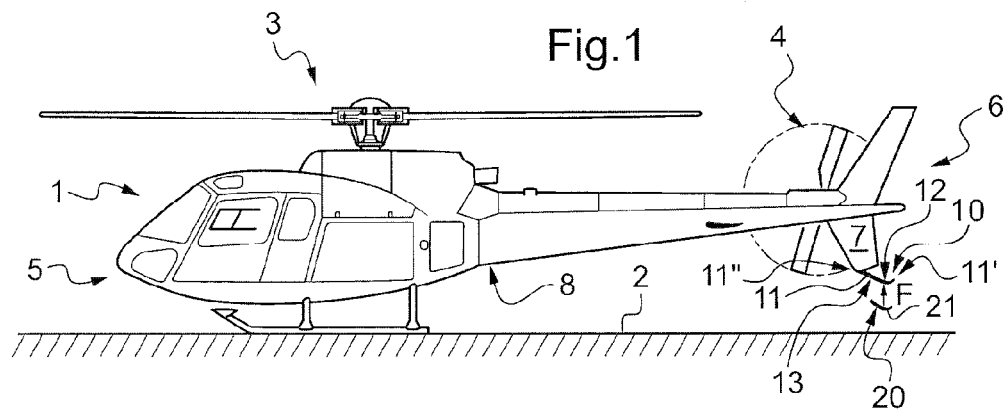

TAIL SKID FOR PROTECTING A STRUCTURAL ELEMENT OF AN AIRCRAFT, AN AIRCRAFT PROVIDED WITH SUCH A TAIL SKID, AND AN ANTI-OVERTURNING METHOD IMPLEMENTED BY SAID TAIL SKID

CROSS REFERENCE TO RELATED APPLICATIONS

This application claims the benefit of FR 09 05767 filed on Nov. 30, 2009. The disclosure of which is incorporated in its entirety by reference herein.

FIELD OF THE INVENTION

The present invention relates to a tail skid for protecting the structural element of an aircraft against impacts with the ground, and to an aircraft fitted with such a tail skid.

More precisely, the invention provides a tail skid for protecting the rear portion of a rotorcraft, and in particular the anti-torque tail rotor of a helicopter.

BACKGROUND OF THE INVENTION

Helicopter certification regulations require the anti-torque tail rotor to be protected so as to avoid said tail rotor impacting against the ground in the event of the helicopter taking on a nose-up position close to the ground.

For example, when landing in auto-rotation, the pilot causes the helicopter nose to take a nose-up position close to the ground, by implementing a so-called "flare" procedure. Consequently, the tail rotor runs the risk of coming into contact with the ground, which might lead to a catastrophic situation.

Furthermore, when landing at high speed, the pilot raises the nose of the helicopter strongly in order to brake.

Thus, aircraft, and in particular helicopters, advantageously include protection against impacting with the ground in the event of the aircraft having a nose-up attitude.

For example, it is possible to place a small wheel at the rear of the aircraft. Optionally, and in accordance with document EP 0 781 224, it is possible to associate the wheel with a ski.

According to document GB 357476, wheeled landing gear may be replaced by skis.

Another known device comprises a crushable and replaceable shoe arranged in a structural element. For example, the Applicant's helicopter known under the trademark Gazelle® is provided with such a shoe inside the keel of its ducted tail rotor, i.e. inside the bottom structural element of said ducted tail rotor that faces the ground when the helicopter is standing on the ground.

Nevertheless, such a shoe needs to be changed or repaired each time it makes damaging contact with the ground. Repairs are sometimes made by the owner of the rotorcraft and might take place under poor conditions.

Alternatively, other aircraft are provided with a resilient tail skid provided with at least one contact blade, a first end of the skid being provided with a curved portion.

In one embodiment, the second end of the blade is fastened by two distinct fastener means to the structural element that is to be protected. Document FR 2 554 210 shows a tail skid of that type arranged on the tail boom of a helicopter.

The skid is then cantilevered out, which is why it is sometimes referred to simply as a "cantilever".

Skids are difficult to develop. Thus, skids need to be stiff enough for the pilot to be aware that the skid has made contact with the ground, while being sufficiently flexible to absorb the energy that results from said contact without giving rise to excessive levels of force in the structure. In spite of that difficulty, they are in widespread use on aircraft.

The state of the art also includes documents GB 462963 and U.S. Pat. No. 4,196,878, in particular.

SUMMARY OF THE INVENTION

Thus, an object of the present invention is to propose an alternative tail skid that serves to prevent the helicopter from overturning when landing on soft ground.

According to the invention, a tail skid for a rotorcraft comprises a contact blade extending from a contact first end towards a second end, said contact first end being provided with a top face suitable for facing a structure of the rotorcraft and a bottom face suitable for facing towards the ground when said tail skid is fastened to a rotorcraft standing on the ground, said bottom face having a first area. The tail skid is remarkable in particular in that it includes an additional contact member suitable for preventing said bottom face from coming into contact with the ground, and fastener means for fastening said additional member to said first end, said additional member having a fastener face and a contact face presenting a second area that is greater than said first area, the fastener means holding said fastener face against said bottom face so that said bottom face is completely covered by said additional member.

Although there would appear to be no direct relationship between the tail skid and a rotorcraft overturning on landing, the Applicant has found that the tail skid of the invention is suitable for avoiding certain kinds of overturning.

The tail skid can be the member of the rotorcraft that is intended to touch the ground first when landing under difficult conditions. In ingenious manner, the Applicant has observed that this impact can be dangerous when the ground is soft, also referred to as loose ground or flexible ground by the person skilled in the art.

It should be observed that hard ground may be represented in a finite element model by using elements that present infinite stiffness, whereas on the contrary soft ground is represented by elements presenting stiffness that is not infinite.

More precisely, in order to understand the problem clearly, the stiffness of soft ground may be defined in a manner that is not constant. Thus, the stiffness of soft ground may have a first value that is large at the instant of the landing gear making contact with the ground, and then a second value that is small following said contact, e.g. having a value of the order of one hundredth of the first value.

Under such circumstances, when the ground is soft, a traditional skid tends to dig into the ground. The skid is then prevented from moving sideways by the ground into which it has penetrated, so any order seeking to modify the lateral cyclic pitch of the blades of the lift rotor(s) tends to cause the rotorcraft to overturn.

This potentially dangerous situation may occur insofar as there are several reasons why such an order might be given. For example, there are two main reasons for giving such an order to a rotorcraft of the helicopter type that is associated with a frame of reference having a roll axis, a pitch axis, and a yaw axis with the rotary wing rotating about said yaw axis, and with the helicopter extending from front to rear along the positive direction of the roll axis.

Concerning a first reason, while landing, a helicopter generally presents an attitude in terms of roll angle that is equal to a few degrees. For example, the helicopter may present a roll angle of a few degrees to the right, corresponding to the helicopter turning about the roll axis in the clockwise direction when looking at the helicopter from the rear towards the front.

Under such conditions, the idea is to place a first skid of the helicopter landing gear on the ground and then after that to place the second skid of the landing gear so as to make contact with the ground progressively and without bounce.

At the moment of making contact with the ground, a pilot then moves the cyclic pitch control sideways a little in order to return to a level roll attitude.

In a second reason, the tail skid is the first member of the helicopter to strike the ground, with the impact between the tail skid and the ground causing negative angular acceleration about the pitch axis of the helicopter and thus causing the helicopter to turn in the negative sense about the pitch axis, tending to bring the nose of the helicopter towards the ground.

Since the rotary wing is rotating about the yaw axis, a gyroscopic effect will cause the helicopter to tilt relative to the roll axis. In other words, the apparently paradoxical gyroscopic effect means that applying a moment about the pitch axis causes the rotary wing and thus also the helicopter to turn about the roll axis. Thus, if in plan view the rotary wing is turning clockwise, then the helicopter will tend to turn clockwise about the roll axis when seen from the rear looking towards the front.

Although this second reason is entirely secondary compared with the first, it has the effect of increasing the resulting action compared with the action to be expected from the first reason.

The pilot thus has two main reasons for actuating the cyclic pitch control to modify the lateral cyclic pitch of the blades of the rotary wing. Since a conventional tail skid can be prevented from moving sideways, the helicopter runs the potential risk of turning over onto its left side.

In contrast, the contact face of the additional member presents an area that is greater than the first area of the contact blade. Compared with a traditional tail skid, the additional member provides additional area seeking to optimize the area of contact between the tail skid and the ground.

The additional member thus prevents the tail skid from penetrating into the ground. Under such circumstances, the tail skid is not held in the ground and does not run the risk of causing the aircraft to overturn. Thus, the tail skid comprises anti-overturning means, the anti-overturning means being constituted by an additional member fastened under the first end of the contact blade by fastener means of the collar, screw, or other type.

By constituting means that prevent the tail skid from penetrating into the ground, the additional member ends up constituting anti-overturning means for the rotorcraft.

In order to dimension the additional member, it is determined which portion of the tail skid penetrates into soft ground, where said portion is the first end, and said additional member is fastened thereto so as to provide a second area that prevents it being pushed in. With the aid of this information, it is possible to implement the invention.

Under such circumstances, with the contact blade extending longitudinally over a first developed length, the first end covers a second developed length lying in the range 10% to 90% of said first developed length, depending on the type of rotorcraft. It should be observed that the developed length is obtained by flattening out the contact blade. Thus, if the contact blade has a plane portion and a curved portion, the contact blade is unfolded in order to measure the various lengths. In other words, the first developed length is the length of the contact blade as measured by a measuring instrument applied tangentially to the contact blade.

The tail skid may also possess one or more of the following characteristics.

For example, the additional member is shaped to match the shape of the contact-making first end.

The first end of the contact blade has a straight zone followed by a curved zone, and the additional member comprises a plane portion facing the straight zone followed by a curved portion facing the curved portion.

Furthermore, the additional member may include two side rims projecting from the fastener face, each cross-section of the additional member presenting a base portion connecting together two side margins representing said rims. The side rims are thus raised side edges and they encourage sideways sliding of the additional member so as to avoid the tail skid becoming blocked in soft ground.

The bottom face and the top face are spaced apart by a first thickness and the side rims projecting from the fastener face present a second thickness, the second thickness being greater than the first thickness.

Furthermore, the additional optional member comprises a triangular plate. Thus, in a variant, the additional member comprises a triangular plate that is advantageously shaped to have the same shape as the blade, by being curved in a distal zone.

Other shapes may be envisaged, in particular and non-exclusively a plate that is oval, circular, or rectangular, for example.

In addition, the tail skid includes a plurality of stiffeners arranged in the fastener face on either side of the first end of the contact blade, e.g. stiffening ribs.

Finally, the contact blade has a first end followed by a second end, and the first end is suitable for being closer to the ground than the second end when the tail skid is fastened to a rotorcraft standing on the ground.

In addition to a tail skid, the invention also provides a rotorcraft fitted with the above-described tail skid.

According to the invention, a rotorcraft is thus provided with a rotorcraft having a rotary wing and an airframe extending longitudinally from a rear portion towards a front portion, the rear portion including a tail skid provided with at least one contact blade, the contact blade extending from a contact first end towards a second end, the contact first end being provided with a top face facing the airframe and a bottom face suitable for facing towards the ground when the rotorcraft is standing on the ground, the bottom face having a first area.

For example, the rear portion corresponds to the tail boom carrying the anti-torque rotor of a helicopter, and the second end of the tail skid is fastened directly or indirectly to a fairing of said rear portion.

The tail skid then advantageously possesses means for opposing overturning of the rotorcraft, the anti-overturning means comprising a contact additional member of the tail skid suitable for preventing the bottom face from coming into contact with the ground, and fastener means for fastening the additional member to the first end, the additional member having a fastener face and a contact face presenting a second area that is greater than the first area, the fastener means holding the fastener face against the bottom face so that the bottom face is completely covered by the additional member.

The invention provides a method of preventing a rotorcraft from overturning forwards or sideways during a landing, the rotorcraft having an airframe extending longitudinally from a rear portion towards a front portion, the rear portion including a tail skid provided with at least one contact blade, the contact blade extending from a contact first end towards a second end, the contact first end being provided with a top face facing the airframe and a bottom face suitable for facing towards the ground when the rotorcraft is standing on the ground, the bottom face having a first area.

In the method, anti-overturning means are placed on the first end, the anti-overturning means comprising a contact additional member of the tail skid suitable for preventing the bottom face from coming into contact with the ground, and fastener means for fastening the additional member to the first end, the additional member having a fastener face and a contact face presenting a second area that is greater than the first area, the fastener means holding the fastener face against the bottom face so that the bottom face is completely covered by the additional member.

BRIEF DESCRIPTION OF THE DRAWINGS

The invention and its advantages appear in greater detail from the following description of embodiments given by way of illustration with reference to the accompanying figures, in which:

FIG. 1 is a side view of rotorcraft of the invention;
FIG. 2 is a view of a first embodiment of a tail skid; and
FIG. 3 is a view of a second embodiment of a tail skid.

DETAILED DESCRIPTION OF THE PREFERRED EMBODIMENTS

Elements present in more than one of the figures are given the same references in each of them.

FIG. 1 shows a rotorcraft 1 having an airframe 3 that extends longitudinally along its roll axis from a rear portion 6 to a front portion 5, the rear portion 6 comprising a tail boom supporting a fin.

Since this rotorcraft is a helicopter, it also has a rotary wing 3 together with an anti-torque rotor 4, the anti-torque rotor 4 being arranged on the rear portion 6. More precisely, the anti-torque rotor 4 is located in the vicinity of the tail fin of the rear portion 6.

Furthermore, the fin conventionally comprises a bottom fairing 7 extending towards the ground 2 on which the rotorcraft 1 is standing.

Under such circumstances, the rotorcraft 1 includes a tail skid 10 with a contact blade 11 that extends from a first end 11' towards a second end 11". The second end 11" is fastened to the fairing 7. Thus, the first end 11' is closer to the ground 2 than is the second end 11" when the tail skid 10 is fastened on a rotorcraft 1 standing on the ground 2.

Consequently, the first end 11' of the contact blade 11 possesses a top face 12 facing the airframe 8 of the rotorcraft 1, and in particular the fairing 7.

Furthermore, this first end 11' has a bottom face 13 facing the ground 2. The bottom face 13 is opposite from the top face 12 and it occupies a first area S1.

The Applicant has identified a risk of the first end 11' being pushed into soft ground, where such an event might lead to an accident under extreme conditions.

To eliminate this risk, the rotorcraft 1 possesses anti-overturning means 20. The anti-overturning means 20 comprise an additional contact member 21 of the tail skid 10, this additional member 21 touching the bottom face 13 as represented by arrow F. In order to hold the additional member 21 in position against the bottom face 13, the tail skid 10 includes fastener means that are not shown in FIG. 1. The fastener means may be of the collar type, of the screw-fastener type, of the adhesive fastening type, of the weld bead type, or of any other known type of fastening that ensures they are connected together.

FIG. 2 shows a first embodiment of a tail skid of the invention.

Independently of the embodiment, the additional member 21 includes a fastener face 22 and a contact face 23, the contact face 23 occupying a second area S2 that is greater than the first area S1 of the first end 11'.

The additional member 21 is then fastened to the first end 11' by the fastener means 40, constituted by collars in the example shown. As a result the fastener face 22 is pressed against the bottom face 13, with the bottom face 13 being completely covered by the fastener face 22 of the additional member 21.

Thus, on a conventional rotorcraft, during landing, the bottom face 13 of the contact blade 11 comes into contact with the ground or even penetrates into the ground. Conversely, in the invention, the additional member prevents the bottom face from making contact with the ground and then penetrating therein, with contact finally taking place between the ground 2 and the contact face 23 of the additional member 21.

Since the second area S2 is greater than the first area S1, the additional member 21 constitutes means for opposing the tail skid penetrating into soft ground, and consequently, in surprising manner, means for opposing overturning of the rotorcraft 1.

Thus, in the invention, in order to avoid the rotorcraft overturning during landing, an additional member 21 is placed under the first end, said additional member having a contact face 23 occupying a second area that is greater than the area occupied by the bottom face 13 of a conventional tail skid.

By way of example, the additional member 21 may be made out of stamped sheet metal, however in alternative manner it may comprise an elastomer, a composite material, a sandwich panel, or indeed expanded metal.

The additional member 21 shown in FIGS. 2 and 3 is also shaped to match the shape of the first end 11' that it covers.

More precisely, the first end 11' of the contact blade 11 has a straight zone 14 followed by a curved zone 15, so the additional member 21 has a plane portion 24 facing said straight zone 14 followed by a curved portion 25 facing said curved zone 15.

Under such circumstances, the additional member 21 constitutes a curved triangular plate so as to match the shape of the first end 11'. Other shapes could be envisaged, e.g. oval, circular, or indeed rectangular.

In addition, the additional member shown is provided with first and second side rims 26 and 27 projecting upwards from the fastener face 22 towards distal ends 26', 27' closer to the fairing 7 and the airframe 8, and consequently going away from the contact face 23. These side rims 26, 27 are thus raised so as to project from the fastener face 22.

The contact blade 11 has a first thickness E1 between its bottom face 13 and its top face 12, and the side rims have a second thickness E2 between the fastener face 22 and their distal ends 26', 27'. The second thickness E2 may optionally be greater than the first thickness E1.

Furthermore, for an additional member made of thin sheet metal, it is advantageous to provide the additional element 21 with a plurality of stiffeners 40, more particularly stiffening ribs arranged in the fastener face 22 on either side of the contact blade 11.

With reference to FIG. 2, in a first embodiment, the tail skid has only one blade, i.e. the contact blade 11. The second end 11" of the contact blade 11 is then fastened to the airframe 8, e.g. to the fairing 7.

Conversely, with reference to FIG. 3, in a second embodiment, the tail skid comprises a contact blade 11 and a fastener blade 50 that extends from a first end zone 51 towards a second end zone 52.

The second end 11" of the contact blade is then secured to the first end zone 51 in a junction zone 60. This junction zone 60 then being fastened to the airframe 8.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A tail skid for a rotorcraft, the tail skid comprising a contact blade extending from a contact first end towards a second end, said contact first end being provided with a top face suitable for facing a structure of the rotorcraft and a bottom face suitable for facing towards the ground when said tail skid is fastened to a rotorcraft standing on the ground, said bottom face having a first area, wherein the tail skid includes an additional contact member suitable for preventing said bottom face from coming into contact with the ground, and fastener means for fastening said additional member to said first end, said additional member having a fastener face and a contact face presenting a second area that is greater than said first area, the fastener means holding said fastener face against said bottom face so that said bottom face is completely covered by said additional member, wherein said first end of the contact blade has a straight zone followed by a curved zone, and said additional member comprises a plane portion facing said straight zone followed by a curved portion facing said curved portion.

2. A tail skid according to claim 1, wherein said additional member is shaped to match the step of said first end.

3. A tail skid according to claim 1, wherein said additional member includes two side rims projecting from said fastener face.

4. A tail skid according to claim 3, wherein said bottom face and said top face are spaced apart by a first thickness (E1) and said side rims projecting from said fastener face present a second thickness (E2), said second thickness (E2) being greater than said first thickness (E1).

5. A tail skid according to claim 1, wherein said additional member comprises a triangular plate.

6. A tail skid according to claim 1, wherein said tail skid includes a plurality of stiffeners arranged in said fastener face on either side of said first end of the contact blade.

7. A tail skid according to claim 1, wherein said contact blade has a first end followed by a second end, and said first end is suitable for being closer to the ground than said second end when said tail skid is fastened to a rotorcraft standing on said ground.

8. A rotorcraft having a rotary wing and an airframe extending longitudinally from a rear portion towards a front portion, said rear portion including a tail skid (provided with at least one contact blade, said contact blade extending from a contact first end towards a second end, said contact first end being provided with a top face facing an airframe and a bottom face suitable for facing towards the ground when said rotorcraft is standing on the ground, said bottom face having a first area, wherein said tail skid possesses means for opposing overturning of said rotorcraft, said anti-overturning means comprising a contact additional member of said tail skid suitable for preventing said bottom face from coming into contact with the ground, and fastener means for fastening said additional member to said first end, said additional member having a fastener face and a contact face presenting a second area that is greater than said first area, the fastener means holding said fastener face against said bottom face so that said bottom face is completely covered by said additional member, wherein said first end of the contact blade has a straight zone followed by a curved zone, and said additional member comprises a plane portion facing said straight zone followed by a curved portion facing said curved portion.

9. A method of preventing a rotorcraft from overturning forwards or sideways during a landing, said rotorcraft having an airframe extending longitudinally from a rear portion towards a front portion, said rear portion including a tail skid provided with at least one contact blade, said contact blade extending from a contact first end towards a second end, said contact first end being provided with a top face facing a said airframe and a bottom face suitable for facing towards the ground when said rotorcraft is standing on the ground, said bottom face having a first area, in which method, anti-overturning means are placed on said first end, said anti-overturning means comprising a contact additional member of said tail skid suitable for preventing said bottom face from coming into contact with the ground, and fastener means for fastening said additional member to said first end, said additional member having a fastener face and a contact face presenting a second area that is greater than said first area, the fastener means holding said fastener face against said bottom face so that said bottom face is completely covered by said additional member, wherein said first end of the contact blade has a straight zone followed by a curved zone, and said additional member comprises a plane portion facing said straight zone followed by a curved portion facing said curved portion.

* * * * *